Dec. 15, 1964 L. HACKLER 3,161,805

CIRCUIT ASSEMBLY FOR ELECTRICAL OFFICE MACHINES AND THE LIKE

Filed Sept. 7, 1962 3 Sheets-Sheet 1

Ludwig HACKLER
*Inventor.* by

Karl F. Ross

AGENT

CIRCUIT ASSEMBLY FOR ELECTRICAL OFFICE MACHINES AND THE LIKE

Filed Sept. 7, 1962 3 Sheets-Sheet 2

Ludwig HACKLER
*Inventor.* by Karl F. Ross
AGENT

Dec. 15, 1964 L. HACKLER 3,161,805

CIRCUIT ASSEMBLY FOR ELECTRICAL OFFICE MACHINES AND THE LIKE

Filed Sept. 7, 1962 3 Sheets-Sheet 3

Ludwig HACKLER
INVENTOR

BY Karl F. Ross
AGENT 3,161,805

CIRCUIT ASSEMBLY FOR ELECTRICAL OFFICE MACHINES AND THE LIKE

Ludwig Hackler, Wilhelmshaven, Germany, assignor to Olympia Werke A.G., Wilhelmshaven, Germany, a corporation of Germany Filed Sept. 7, 1962, Ser. No. 222,160
Claims priority, application Germany, Sept. 8, 1961, O 8,252
4 Claims. (Cl. 317—101)

My present invention relates to electrically operated office equipment, such as adding machines, in which certain electrical components are optionally provided or are for other reasons physically separated from the remainder of the system.

In adding machines, for example, it is often desirable to have available an electrical filter network which should be independent of the other electrical components and selectively connectable in circuit therewith to act as a static suppressor. The general object of this invention is to provide means for inconspicuously accommodating such circuit assembly at a convenient location where it will not interfere with the operation of the device proper and will not materially add to its bulk.

A more specific object of my invention is to provide simple means for mounting such static suppressors and similar units at the base of the machine.

In accordance with a feature of this invention I provide an insulating mounting plate with printed circuit means on one side and with additional circuit elements supported on the other side thereof, such circuit elements including, for example, two spaced-apart groups of terminals, a set of reactances and a switch for selectively cutting these reactances into and out of circuit between the terminal groups. Suitable leads pass through the mounting plate to connect the aforesaid circuit elements with the printed circuit means, these leads being preferably held as short as possible through a proper alignment of their junctions on both sides of the mounting plate. A cover plate, likewise of insulating material, is disposed adjacent the mounting plate so as to overlie the printed circuitry of the latter. The two plates may be formed with registering cutouts to accommodate an actuating lever for the switch or switches carried by the mounting plate.

The term "printed circuitry" is intended to embrace any layer of conductive material covering selected portions of its plate surface, whether applied by printing, etching, plating, spraying or other conventional methods.

The invention will be described in greater detail hereafter, reference being made to the accompanying drawing in which.

Figure 1:
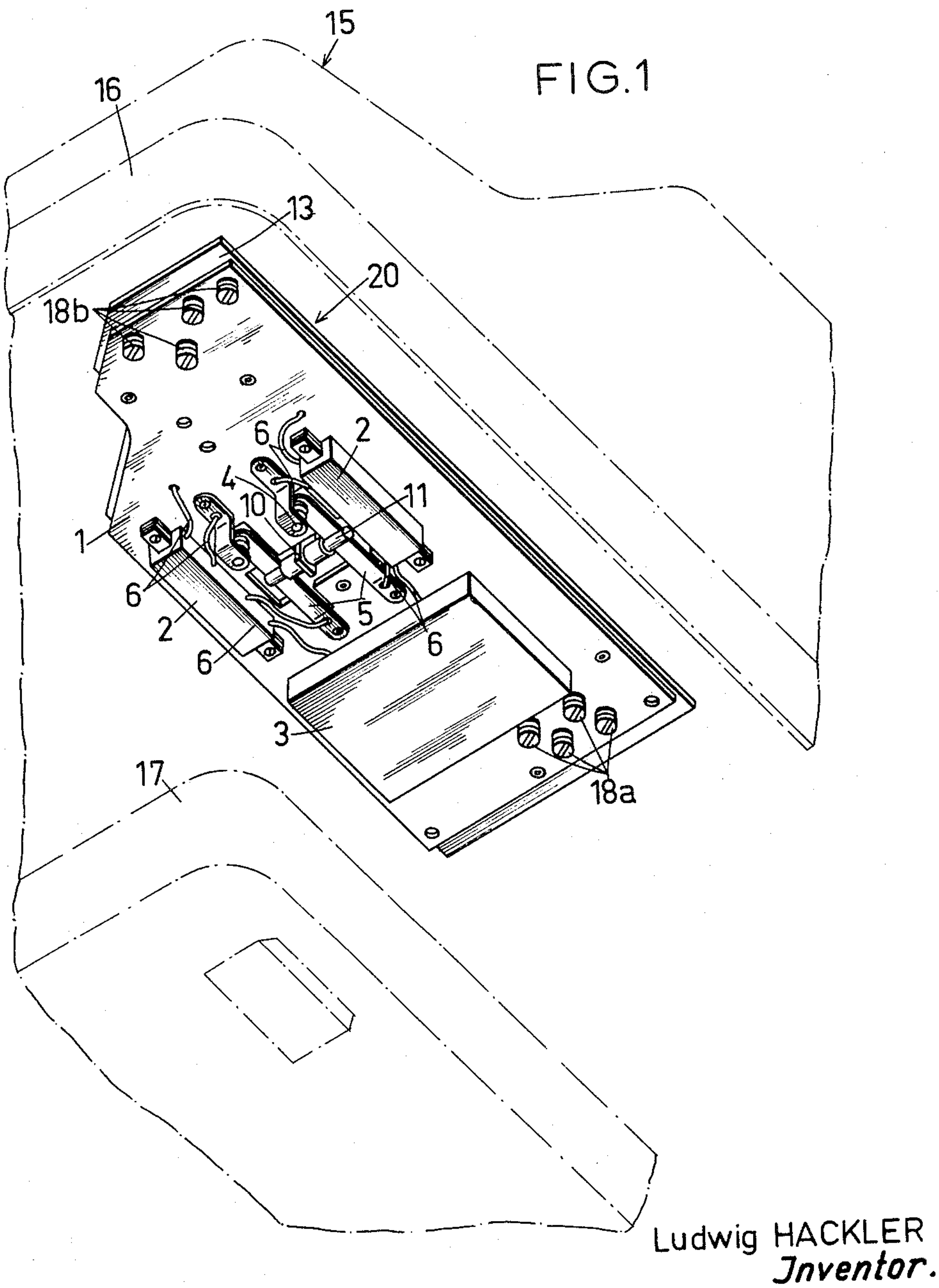
FIG. 1 is a perspective bottom view of an electrical unit according to the invention positioned on the underside of an adding-machine base.

In FIG. 1 I have outlined a conventional adding machine 15 having a base 16 with one or more feet 17 maintaining this base elevated above a table top or other support so that its underside will accommodate a unit 20 incorporating a circuit assembly according to my invention.

Figure 2:
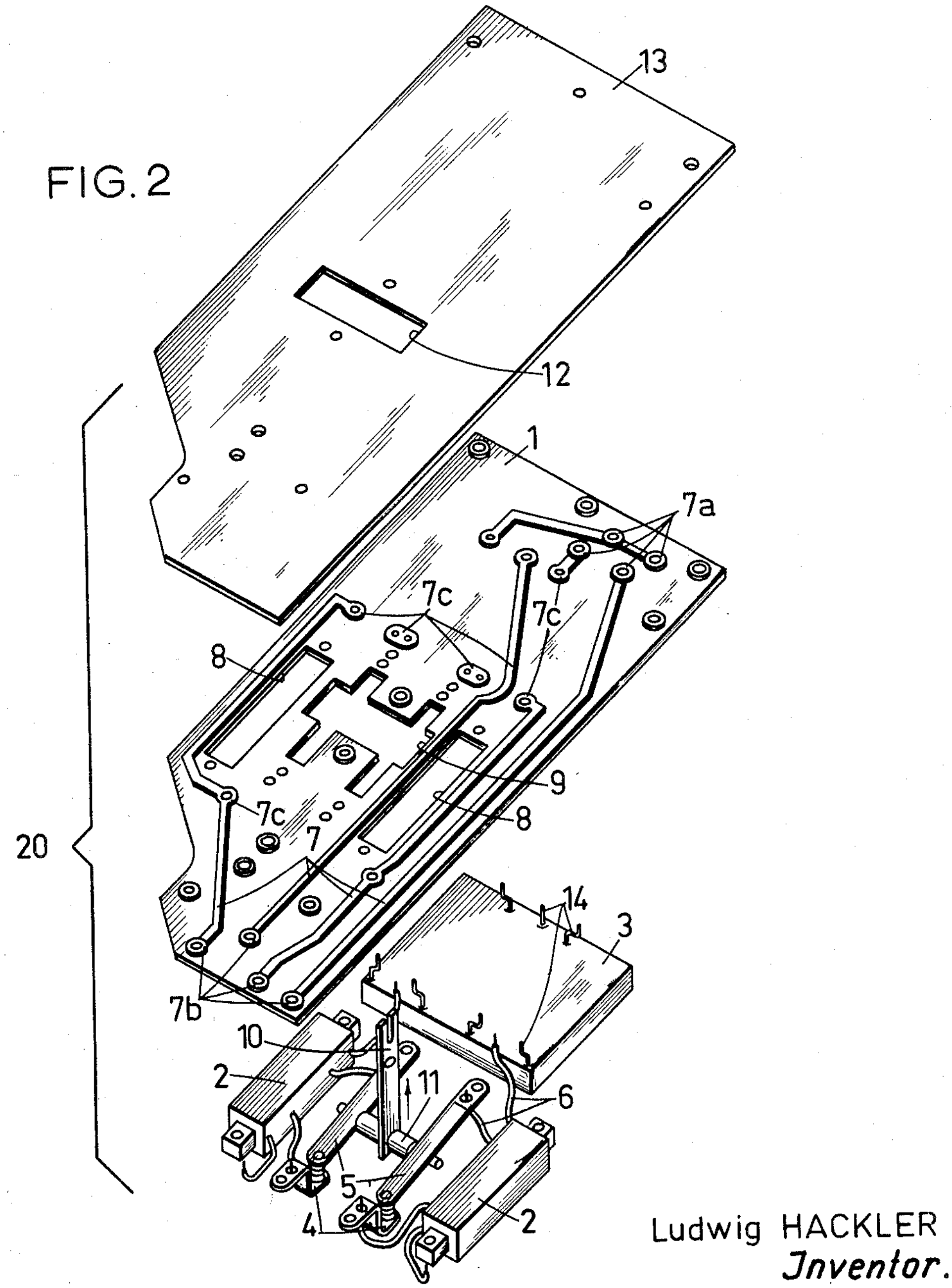
FIG. 2 is an exploded perspective of the same unit seen from above.
Figure 3:
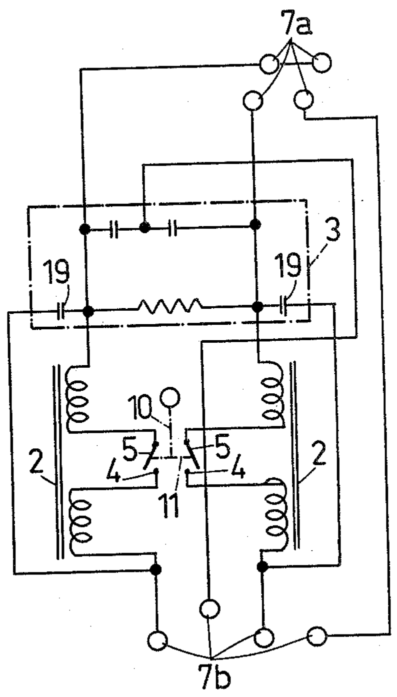
FIG. 3 is an equivalent circuit diagram for the unit shown in FIGS. 1 and 2.

As shown in FIGS. 1 and 2, unit 20 comprises an insulating mounting plate 1 of generally rectangular configuration and a similarly shaped insulating cover plate 13 registering therewith. Mounting plate 1 is formed with a pair of lateral cutouts 8 and a central cutout 9, the latter registering in part with a similar cutout 12 in cover plate 13. The upper surface of plate 1 carries a system of printed circuits which have been generally designated 7 and form junction points *7a*, *7b*, *7c* at various locations. Short leads 14, also serving as mounting pins, extend from these junction points through perforations in plate 1 toward the other side of the latter on which a number of circuit elements are independently supported; other leads 6 interconnect these circuit elements which include a unit 3, two induction coils 2, two groups of terminals **18*a*, 18*b*** respectively aligned with junctions *7a*, *7b*, and a double-armed switch having a pair of contact arms 5 co-operating with stationary contacts 4. Switch arms 5 are controlled by an actuating mechanism of which only a crank shaft 11 and a lever 10 rigid with this shaft have been illustrated. Coils 2 are partly received in the cutouts 8 whereas lever 10, whose lower end along with shaft 11 is accommodated by the cutout 9 of the plate 1, passes upwardly through cutout 12 of plate 13. Circuit element 3 encloses part of a filter network which includes the coils 2 along with a pair of condensers 19.

The coils 2, symmetrically disposed on opposite sides of the switch 4, 5, 10, 11, are split at their midpoints and have the contacts 4, 5 in series with their two halves. If these contacts are opened by actuation of lever 10, the conductive path between terminals *7a* and *7b* through coils 2 is interrupted; if contacts 4, 5 are closed by the lever 10, coils 2 shunted by condensers 19 establish a pair of parallel-resonant circuits adapted to block the flow of noise frequencies while passing direct and low-frequency alternating currents to operate the machine 15.

Modifications of the system described and illustrated will readily suggest themselves to persons skilled in the art and are intended to be embraced within the spirit and scope of the invention as defined in the appended claims.

I claim:

1. An assembly of circuit elements for office machines and the like, comprising a mounting plate with printed circuitry on one side, a set of circuit elements including two spaced-apart groups of terminals on the other side of said plate, said circuit elements further including reactance means and mechanically operable switch means for selectively connecting said reactance means between said groups of terminals, leads extending through said plate and connecting said circuit elements to different portions of said printed circuitry, and a cover plate adjacent said mounting plate overlying said printed circuitry, said plates being provided with registering cutouts accommodating an actuating element for said switch means.

2. An assembly of circuit elements for office machines and the like, comprising a generally rectangular mounting plate with printed circuitry on one side, a set of circuit elements including two spaced-apart groups of terminals on the other side of said plate near opposite ends thereof, said circuit elements further including reactance means and mechanically operable switch means for selectively connecting said reactance means between said groups of terminals, leads extending through said plate and connecting said circuit elements to different portions of said printed circuitry, and a cover plate adjacent said mounting plate overlying said printed circuitry, said plates being provided with registering central cutouts accommodating an actuating element for said switch means.

3. An assembly according to claim 2 wherein said reactance means comprises a pair of coils disposed laterally of said cutouts on opposite sides thereof, said mounting plate being provided with a pair of lateral cutouts having said coils seated therein.

4. In an electrically operable office machine having a base, the combination therewith of a mounting plate with printed circuitry on its top side and a set of circuit elements including two spaced-apart groups of terminals on its bottom side, said circuit elements further including impedance means and mechanically operable switch means for selectively connecting said impedance means between said groups of terminals, leads extending through said plate and connecting said circuit elements to different portions of said printed circuitry, a cover plate immediately above said mounting plate overlying said printed circuitry, fastening means securing said plates to the underside of said base, said plates being provided with registering cutouts between said groups of terminals, and an actuating element for said switch means extending upwardly through said cutouts into said base.

References Cited by the Examiner

UNITED STATES PATENTS

| | | | |
|---|---|---|---|
| 2,777,193 | 1/57 | Albright et al. | 317—101 |
| 3,105,868 | 10/63 | Feign et al. | 317—101 |

JOHN F. BURNS, *Primary Examiner.*